United States Patent Office 3,369,752
Patented Feb. 20, 1968

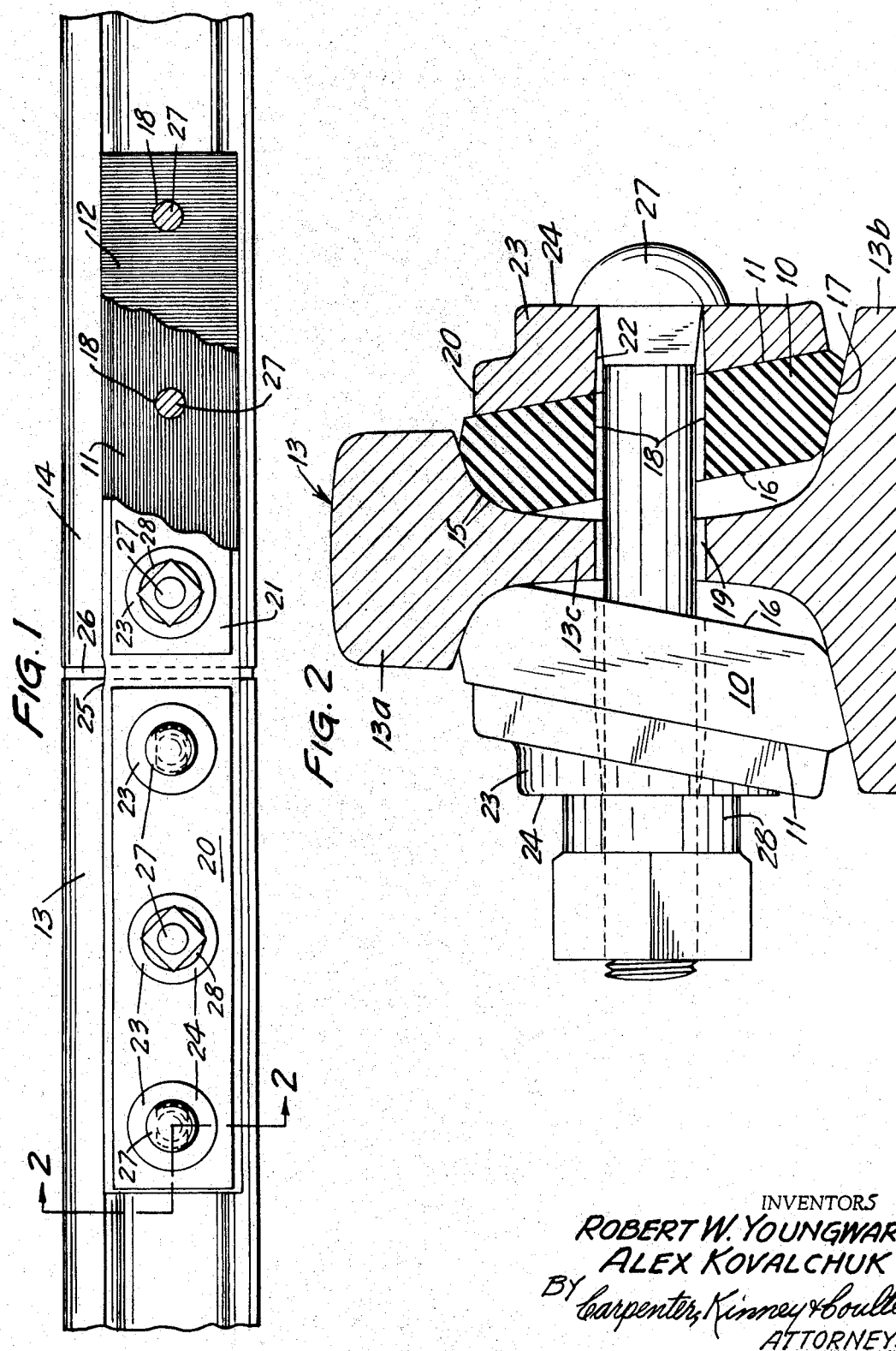

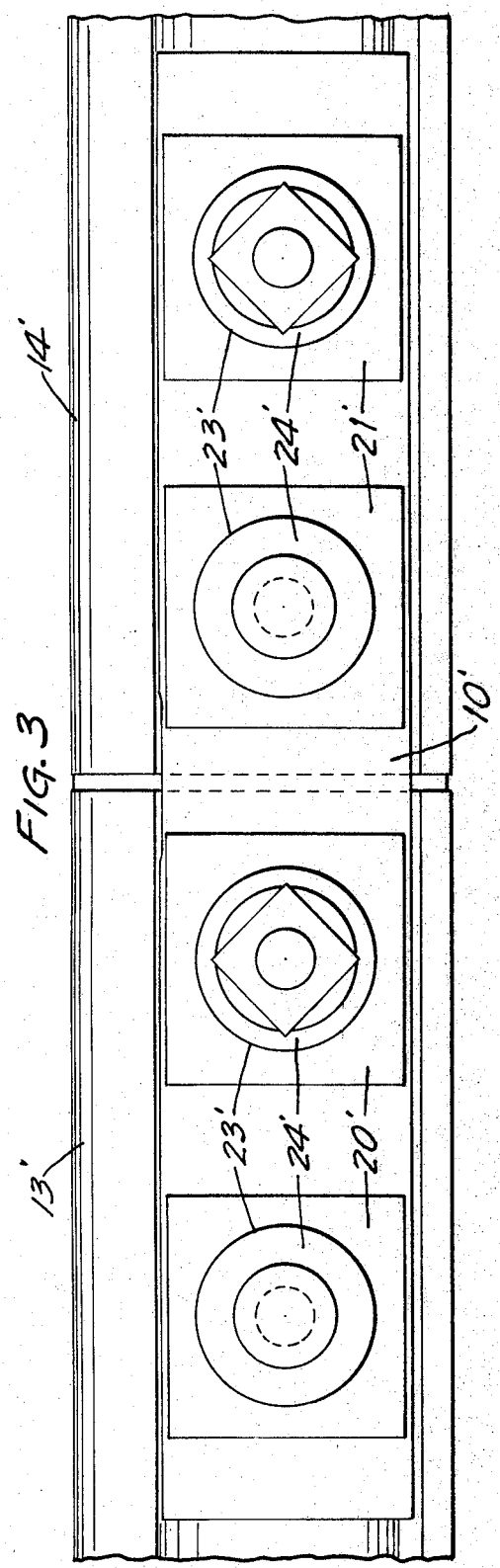

3,369,752
ELECTRICALLY INSULATED RAIL JOINT MEANS
Robert W. Youngward, Columbia Heights, and Alex Kovalchuk, Burnsville, Minn., assignors to Minnesota Mining and Manufacturing Company, St. Paul, Minn., a corporation of Delaware
Continuation-in-part of application Ser. No. 503,085, Oct. 23, 1965. This application Apr. 27, 1967, Ser. No. 648,510
5 Claims. (Cl. 238—243)

ABSTRACT OF THE DISCLOSURE

Structural rail joint having electrically insulating filament-reinforced resinous joint bars. The joint bars are shaped to nest against the underlying curved surfaces of the rail heads and against the tapered rail bases, but not against the rail webs, while clamped with two pairs of bearing plates or paired sets of bearing plates to join adjacent railroad rails.

The present application is a continuation-in-part of our copending application Ser. No. 503,085 filed Oct. 23, 1965, now abandoned.

*Background of the invention*

Insulated rail joints have long posed a difficult design problem because such high forces are developed between the rails and the joint bars. Laboratory and field investigations and theoretical analyses concerning the mechanics of the action of the rail joint have led the industry to conclude that no electrical insulation known is strong enough to resist these forces without protective steel armor. Another generally accepted conclusion has been that for satisfactory serivce, the rail joint should have close to the same stiffness as the full rail. A report to this effect was printed and distributed by the Association of American Railroads in March 1961, Report No. ER-9 entitled "Insulated Rail Joint Development and Research."

*Description of the prior art*

In keeping with such belief, until recently all insulated rail joints have for many years been constructed in a manner generally similar to the joints illustrated in Corey Patent No. 1,174,478 (1916) and Payne Patents Nos. 2,016,214 (1935) and 2,628,784 (1953). Such rail joints consist of a pair of steel joint bars bolted to the rails across the rail juncture with insulating layers of hard fiber between the joint bars and rails and surrounding the bolts. Although such insulation is initially very hard and reasonably waterproof, the punishment it takes under rolling loads plus its tendency to swell and soften from moisture, which conditions are compounded by temperature changes, destroy its insulating value within relatively short periods of time. In the past few years, some improvement has been indicated by vulcanizing a layer of very hard rubber on the steel joint bar along with a steel protective shim, but the rubber insulation still fails within undesirably short periods of time. Early tests on this are discussed in the above-cited Report No. ER-9 of the Association of American Railroads.

The same report also contains tests on rail joints in which the joint bars themselves were insulating materials such as laminated resin-impregnated wood or high-strength plastics. Such structures were known as long ago as 1905 as indicated by Lewis Patent No. 783,751 but apparently never earned acceptance by American railroads prior to the present invention.

*Features of the invention*

This invention provides for the first time an insulated rail joint which will withstand for long periods the rigors of modern rail transportation even through the joint bars themselves are of electrical insulating material, specifically laminated reinforced plastic. Although such material is of much lower stiffness than is steel, typically one-ninth the stiffness of steel, the novel rail joint has performed exceedingly well in test installations and may well outlast the best insulated steel rail joints.

The laminae of the joint bars of the novel rail joint comprise a high proportion of fine, high-tensile filaments such as glass embedded in hard, tough, void-free resinous material such as thermoset epoxy resin. By "a high proportion" is meant that the filaments should comprise at least one-third of the volume of the laminae. When the filaments are relatively dense as is glass, they should comprise at least one-half the weight of the laminae. Because of the high forces transmitted longitudinally through the rails, more than half of the filaments should extend in the lengthwise direction, or if a substantial number of the filaments extend obliquely to the longitudinal, the lengthwise component of all of the filaments should exceed the transverse component. However, the total transverse (generally vertical) component of all of the filaments should be at least one-tenth the total longitudinal component, and the joint bars should include laminae providing significant transverse reinforcement every 100 mils (2.5 mm.) or less through the joint bars, preferably every 50 mils or less. Otherwise the joint bars would prematurely develop longitudinal cracks. For ease and economy of manufacture, the joint bars preferably are generally flat and of uniform thickness, and hence of a uniform number of laminae throughout their length, one lamina forming a broad outer-facing surface and another forming a broad inner-facing surface. When so constructed, the filament reinforcement of the two surface laminae should extend in the lengthwise direction of the joint bars. Other important or preferred features in the construction of the insulated rail joint of this invention will be considered in connection with the drawing.

*Description of the drawing*

FIGURE 1 is a front elevation, in part cut away, of a preferred embodiment of the rail joint of this invention;
FIGURE 2 is an enlarged elevation, partly in section, taken generally along line 2—2 of FIGURE 1; and
FIGURE 3 is a front elevation of another embodiment of the rail joint of this invention.

*Description of one employment*

The elongated joint bars 10 illustrated in FIGURES 1 and 2 of the drawing are laminated reinforced plastic, each lamina being a relatively thin layer of aligned bundles of glass filaments embedded in thermoset resin. As indicated in the cut-away portions of FIGURE 1, the filament bundles of the outer laminae extend longitudinally and provide a broad flat outer-facing surface 11 while the filament bundles of less than half of the inner laminae 12 extend transversely through the width of the joint bar 10. Each joint bar 10 fits against the rails 13, 14 with its outer-facing surface 11 inclined from the vertical toward the rail head 13a as shown in FIGURE 2. The upper surface 15 of each joint bar 10 at the edges of the laminae is rounded toward the broad inner-facing surface 16 in order to nest against the underlying curved surfaces of the rail head 13a. The lower surface 17 of each joint bar 10 at opposite edges of the laminae is tapered toward the inner-facing surface 16 to nest against the tapered rail bases 13b. The geometry of the inner-facing surface 16 is not critical as long as it is spaced from the rail web 13c as it is in FIGURE 2. Each joint bar 10 is also provided with six holes or bores 18, each of which is aligned with one of the three attaching holes 19 in each of the rails 13, 14. The axes of the bores 18 are inclined from perpendicular to the outer-facing surface 11 at the same angle as the outer-facing surface 11 is inclined with respect to the vertical. That angle is preferably about ten degrees as in the illustrated embodiment but may be as little as about five or as much as about twenty degrees from the vertical.

A pair of cast iron bearing plates 20, 21 is mounted against each joint bar 10 with each plate substantially coincident with one half of the flat surface 11 extending from one end of the joint bar 10 to the rail juncture but spaced from the other of the plates 20, 21. Each of the plates 20, 21 has a bore 22 aligned with each bore 18 of the contiguous joint bar 10, and a boss 23 having a substantially vertical flat outer-facing surface 24 is formed at each bore 22. Tapered washers could be used instead of bosses but would be less convenient to use. A slight depression 25 is machined centrally in the upper edge surface 15 of each joint bar 10 in order to provide clearance from the sharp edges at the ends of rails 13, 14 which might otherwise cut into the joint bars 10 under the weight of passing railroad equipment.

Sandwiched between the rails 13, 14 is an insulating end post 26 which may be formed of any durable, water-resistant insulating material in the shape of the rail cross-section. Molded reinforced resin comprising a high proportion of randomly-oriented short glass filaments in thermoset resin has been found to be particularly suitable for use in the novel insulated rail joint. When the bores 18 and 22 of the joint bars 10 and bearing plates 20, 21 are lined up with the attaching holes 19 in the rails 13, 14, the assembly is fastened with bolts 27 and lock washers 28, and this secures the end post 26 in place.

Description of another embodiment

Because of the great variety in railroad rails and the positioning of attaching holes in the rails, it has been necessary to stock an assortment of the bearing plates 20, 21. In order to avoid doing so, the insulated rail joint of this invention may include an individual bearing plate at each attaching hole as shown in FIGURE 3. The two bearing plates 20' conform to substantially the full height of the outer side surface of the joint bar 10' and should cover a substantial lengthwise portion, preferably at least about half, of the joint bar 10' from one end to the rail juncture. The plates 20' may touch each other or be spaced as shown in FIGURE 3 but are spaced from the bearing plate means provided by the plates 21'.

Each of plates 20', 21' is bonded to the joint bar 10', preferably with a thermosetting adhesive such as a heat-curing epoxy resin composition. This insures that the outer-facing surfaces 24' of the bosses 23' remain substantially vertical during attachment of the joint bar 10' to the rails 13' and 14'. Furthermore, it is a convenience in shipping, handling and assembly to have the bearing plate means already in place.

The design illustrated in FIGURE 3 should enable use of a universal bearing plate, thus greatly simplifying manufacture and inventory.

The following example describes the construction of an insulated rail joint of this invention which has demonstrated good performance in actual use in a number of test installations.

Example

Laminated plastic joint bars were constructed from sheets cut from a roll which had been made by drawing through a heated bath of epoxy resin and hardener a web of lineally-aligned bundles of continuous glass filaments, viz, 200 ends or bundles per inch of ECG 140's, 20 end roving, vinyl silane size. Each end included 204 glass monofilaments of about 0.00038-inch diameter. The epoxy resin was made from epichlorhydrin and bisphenol A and had a Durrans' softening point of approximately 30–40° C., and the hardener was basically isophthalyl dihydrazide. After immersion in the bath of resin which was maintained at about 95° C., the web of glass was passed through squeeze rolls to densify and flatten it to a glass:resin ratio of 64:36 by weight and was then contacted with a disposable low-adhesion liner and wound therewith into roll form.

125 sheets cut from the web were stacked together with the filament reinforcement predominantly extending in one direction but with the filaments of every fourth layer extending transversely to that direction. The whole was placed in a heated platen press which had been preheated to 120° C. Pressure was gradually applied over a period of eight minutes to 50 p.s.i. to give a thickness of 1¼ inches. After two hours in the press at 120° C., the cured panel was removed to an air-circulating oven where it was post-cured for 16 hours at about 138° C. After being cooled to room temperature, the panel was sawed and machined to provide a pair of joint bars as illustrated in the drawing, each 36 inches long in the direction of predominant filament reinforcement and 4¾ inches wide. Six holes were drilled at a 10° inclination as in FIGURE 2 of the drawing, each 1⅛ inches in diameter.

Pairs of joint bars of this example have been used in a large number of test installations on various American railroads with cast iron bearing plates, bolts and glass-reinforced-resin end posts as illustrated in FIGURES 1 and 2 of the drawing. Other installations have employed joint bars having only four bores as in FIGURE 3 of the drawing. In only one case has there been a failure of a joint bar. In isolated cases, bearing plates and bolts have been broken for extraneous reasons. Two installations have been in service for two years as of the filing date of the present application, one of which is in a special problem location where prior art insulated joints have invariably failed prematurely. Other test installations have been in service for shorter periods but give indication of long life.

Although the rail joint of this invention does not provide the stiffness afforded by insulated steel rail joints and so permits more flexing at the joint than was heretofore considered permissible, its construction is such that it withstands the punishing forces applied to rail joints for long periods of time, especially when the fibrous reinforcement of the joint bars consists of lineally-aligned bundles of continuous glass filaments. The novel rail joint is also favored by virtually perfect resistance to water and to other adverse environmental conditions, especially where the reinforcement in the joint bars is glass and the resin is epoxy resin. In contrast, the stiffer armored steel insulated rail joints of the prior art are quite susceptible to damage where the road bed is soft or the rail joints are otherwise subjected to severe compressive and abrasive forces resulting in mechanical deterioration of the electrical insulating layers. This problem in the prior art has been particularly vexing in wet areas. Accordingly, it is believed that the prejudice in the railroad industry against rail joints which do not afford a stiffness approaching that of the rail will be overcome by this novel insulated rail joint because of the great resistance to failure afforded by its unique construction. In fact, such prejudice has already been allayed to a considerable extent as of the filing of the present application.

We claim:

1. Means for providing an electrically insulated structural joint between adjacent railroad rails which are formed with heads having underlying curved surfaces, with tapered bases, and with a plurality of attaching holes through the web of each rail, said joint means when assembled comprising:

(A) a pair of elongated, electrically insulating, laminated joint bars extending along opposite sides of the rails across the rail juncture, the laminae of the joint bars comprising a high proportion of fine, high-tensile filaments embedded in hard, tough, void-free resinous material, which filaments predominantly extend lengthwise with respect to the bar but have a transverse component of at least 10%, each of said bars
  (1) having broad inner-facing and outer-facing side surfaces and relatively narrow upper and lower surfaces at the edges of the laminae,
      (a) said outer side surface being generally flat and formed substantially by one of the laminae,
      (b) said upper edge surface being rounded toward the inner side surface,
      (c) said lower edge surface tapering inwardly toward the inner side surface,
  (2) positioned with respect to said rails with said rounded upper edge nesting against the underlying curved surfaces of the rail heads, with said tapering lower edge nesting against the tapered rail bases, with said outer side surface inclined toward the rail heads at least about five degrees from the vertical, and with said inner side surface spaced from the rail webs,
  (3) having a bore aligned with each attaching hole of the rail webs when the rail ends are insulatingly spaced,
(B) four bearing plate means positioned in pairs on opposite sides of the rails,
  (1) each plate means conforming to substantially the full height of and at least about half of the length of one half of the outer side surface of one of the joint bars but spaced from the paired plate means,
  (2) each pair of plate means having a bore aligned with each bore of said joint bar,
  (3) each plate means having a substantially vertical flat outer-facing surface at each bore, and
(C) adjustable mechanical fastening means extending completely through each set of bores and holes of the plate means, joint bars and rail webs.

2. The electrically insulated rail joint means defined in claim 1 wherein each of said bearing plate means is a single plate formed with a plurality of bores and a boss at each bore to provide said substantially vertical flat outer-facing surface.

3. The electrically insulated rail joint means defined in claim 1 wherein each of said bearing plate means consists of a plurality of plates, each of which plates has a single bore and a boss at the bore to provide said substantially vertical flat outer-facing surface.

4. The electrically insulated rail joint means defined in claim 3 wherein each of said plurality of plates is bonded to one of the joint bars.

5. Means for providing an electrically insulated structural joint between adjacent railroad rails which are formed with heads having underlying curved surfaces, with tapered bases, and with a plurality of attaching holes through the web of each rail, said joint means when assembled comprising:
(A) a pair of elongated, electrically insulating, laminated plastic joint bars extending along opposite sides of the rail juncture, each lamina of the joint bars comprising a high proportion of lineally-aligned bundles of continuous glass filaments embedded in hard, tough, void-free thermoset resinous material, which filaments predominantly extend lengthwise with respect to the bar but have a transverse component of at least 10%, each of said bars
  (1) having broad rectangular inner-facing and outer-facing side surfaces and relatively narrow upper and lower surfaces at the edges of the laminae,
      (a) said side surfaces being flat and parallel to each other and each formed substantially by one of the laminae,
      (b) said upper edge surface being rounded toward the inner side surface,
      (c) said lower edge surface tapering inwardly toward the inner side surface,
  (2) positioned with respect to said rails with said rounded upper edge nesting against the underlying curved surfaces of the rail heads, with said tapering lower edge nesting against the tapered rail bases, with said outer side surface inclined toward the rail heads at least about five degrees from the vertical, and with the inner side surface spaced from the rail webs,
  (3) having a bore aligned with each attaching hole of the rail webs,
(B) four metal bearing plates positioned in pairs on opposite sides of the rails,
  (1) each plate having a flat surface substantially co-incident with half of the outer side surface of one of the joint bars and spaced from the paired plate,
  (2) each pair of plates having a bore aligned with each bore of said joint bar,
  (3) each plate having a substantially vertical flat outer-facing surface at each bore,
(C) an insulating end post sandwiched between the rails, and
(D) adjustable mechanical fastening means extending completely through each set of bores and holes of the plates, joint bars and rail webs.

References Cited

FOREIGN PATENTS 1,373,422  8/1964  France.

ARTHUR L. LA POINT, *Primary Examiner.*

R. A. BERTSCH, *Assistant Examiner.*